US011911987B2

(12) United States Patent
Atutxa Briones et al.

(10) Patent No.: US 11,911,987 B2
(45) Date of Patent: Feb. 27, 2024

(54) WIND TURBINE BLADE

(71) Applicant: Siemens Gamesa Renewable Energy Innovation & Technology S.L., Sarriguren (ES)

(72) Inventors: Mikel Atutxa Briones, Bizkaia (ES); Pedro Jato Losfablos, Pamplona (ES); Jorge Lana Galdeano, Navarra (ES); Nicolas Rojo Saiz, Navarra (ES); Javier Yuste Soler, Navarra (ES)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 52 days.

(21) Appl. No.: 17/640,935

(22) PCT Filed: Sep. 11, 2020

(86) PCT No.: PCT/EP2020/075537
§ 371 (c)(1),
(2) Date: Mar. 7, 2022

(87) PCT Pub. No.: WO2021/048398
PCT Pub. Date: Mar. 18, 2021

(65) Prior Publication Data
US 2022/0332074 A1 Oct. 20, 2022

(30) Foreign Application Priority Data

Sep. 13, 2019 (EP) ..................................... 19380021
Nov. 15, 2019 (EP) ..................................... 19380028

(51) Int. Cl.
*B29D 99/00* (2010.01)
*F03D 1/06* (2006.01)

(52) U.S. Cl.
CPC ....... *B29D 99/0028* (2013.01); *F03D 1/0675* (2013.01); *F05B 2280/6003* (2013.01)

(58) Field of Classification Search
CPC ............... B29D 99/0028; F03D 1/0675; F05B 2280/6003
See application file for complete search history.

(56) References Cited

U.S. PATENT DOCUMENTS

2014/0271217 A1* 9/2014 Baker ................... F03D 1/0683
416/226
2016/0177920 A1 6/2016 Donazar Moriones et al.
(Continued)

FOREIGN PATENT DOCUMENTS

EP        2791500 A1    10/2014
WO    2019068294 A1     4/2019

OTHER PUBLICATIONS

PCT International Search Report and Written Opinion of International Searching Authority dated Dec. 7, 2020 corresponding to PCT International Application No. PCT/EP2020/075537 filed Sep. 11, 2020.

*Primary Examiner* — Brian O Peters
(74) *Attorney, Agent, or Firm* — Schmeiser, Olsen & Watts LLP

(57) ABSTRACT

Provided is a wind turbine blade, with a generally hollow blade body including half shells and webs the webs including flanges connecting the respective web to the respective half shell, and with webs being supported via reinforcement structures relative to the respective half shell, which reinforcement structures are arranged between an outer and an inner layer of each half shell and extend in the lengthwise direction of the blade, whereby the reinforcement structures each include at least one stack composed of several glass fiber layers infused with resin, and that at least one stiffening element extending parallel to the first and second reinforce- (Continued)

ment structures over at least a part of their length including at least one stack composed of several pultruded composite strips including carbon fibers with the strips being fixed in the resin is arranged between the first and second reinforcement structures.

12 Claims, 3 Drawing Sheets

(56) References Cited

U.S. PATENT DOCUMENTS

2018/0223798 A1* 8/2018 Caruso .............. B29D 99/0025
2018/0372066 A1  12/2018 Livingston et al.

* cited by examiner

WIND TURBINE BLADE

CROSS-REFERENCE TO RELATED APPLICATIONS

This application claims priority to PCT Application No. PCT/EP2020/075537, having a filing date of Sep. 11, 2020, which claims priority to EP Application No. 19380028.1, having a filing date of Nov. 15, 2019, and EP Application No. 19380021.6, having a filing date of Sep. 13, 2019, the entire contents both of which are hereby incorporated by reference.

FIELD OF TECHNOLOGY

The following relates to a wind turbine blade, with a generally hollow blade body comprising an upper and a lower half shell and first and second elongated webs each extending in the lengthwise direction of the blade and being disposed between the and connected to the upper and the lower half shell, with each web comprising an upper and a lower flange connecting the respective web to the respective half shell, and with the first and second webs being supported via respective first and second reinforcement structures relative to the respective half shell, which reinforcement structures are arranged between an outer and an inner layer of the upper and lower half shell and extend in the lengthwise direction of the blade.

BACKGROUND

As commonly known, wind turbine blades are parts of a wind turbine which is used for generating electric power. A wind turbine usually comprises three blades attached to a hub, which is connected to a generator arranged in a nacelle. The blades interact with the passing wind resulting in a rotation of the hub finally driving the generator.

A turbine blade usually comprises a hollow blade body with an upper and a lower half shell, which are usually separately produced and fixed to each other. Within this hollow blade body first and second elongated webs are arranged, which connect both half shells and support them while also transferring the loads acting on the respective shells due to aerodynamic reasons and the circular movement of the blade when rotating. The load comprises pressure and suction loads on the upper and lower half shell and compressive and tensile loads. A wind turbine blade with this common setup is for example disclosed in EP 2 791 500 B1.

For supporting the half shells and for transferring the respective loads each elongated web extends in the lengthwise direction and is connected to the respective half shell via a flange provided at the respective web side, which flange is attached to an inner layer of the upper and lower half shell by an adhesive. For transferring the loads respectively supporting the respective shells each web is supported via respective first and second reinforcement structures relative to the respective half shell. Such a reinforcement structure is commonly also named as a spar cap. Like the respective webs and their flanges, also these reinforcement structures or spar caps extend in a lengthwise direction of the blade. These reinforcement structures, as for example also enclosed in EP 2 791 500 B1, are made of stacks comprising separate carbon fiber pultrusion strips, which are arranged above each other and fixed in a resin matrix. During the manufacturing of such a pultruded strip, the carbon fibers are pulled through a supply of liquid resin, which resin is then heated and cured finally forming the respective pultruded strip. These pultruded carbon fiber strips show excellent mechanical properties in taking the respective loads and distributing them and also absorb high bending moments which arise during the blade rotation.

In a known wind turbine blade design as for example disclosed in EP 2 791 500 B1 the blade comprises a first and a second web, which extend almost entirely over the length of the blades and which are arranged in the central body area, i.e., in the area, where the upper and lower half shell, seen in the drop-like cross section, have a large distance. It is also possible to provide a third web, which web is arranged close to the trailing edge of the blade. This third web extends only along apart of the trailing edge, which in this part often has a specific edge design and is subjected to specific loads, which are taken respectively distributed by this web.

All webs comprise an elongated web body with the flanges arranged at the ends of the web body. Each web is supported by two reinforcement structures, i.e., spar caps, so that in total six spar caps are arranged in both shells for supporting the three webs. If only the first and the second web is provided, four spar caps need to be integrated, if three webs are provided six spar caps need to be integrated. The spar caps made of the carbon strips are pre-fabricated and are arranged in the shell mould for their integration. As two or three webs and four or six spar caps need to be integrated, the total mass of such a known turbine blade is high, although the mass of the spar caps itself is somehow reduced due to the use of carbon fiber pultrusion stacks, which on the other hand need to be fabricated external to the shell and are expensive.

SUMMARY

Thus, there is a need for an improved wind turbine blade design allowing a proper load support and having a less complex and expensive design.

For addressing this problem a wind turbine blade as mentioned above is characterised in that the first and second reinforcement structures each comprise at least one stack composed of several glass fiber layers infused with resin, and that at least one stiffening element extending parallel to the first and second reinforcement structures over at least a part of their length comprising at least one stack composed of several pultruded composite strips comprising carbon fibers with the strips being fixed in the resin is arranged between the first and second reinforcement structures.

The inventive wind turbine is characterised by a specific layout or design of the support structure integrated in the upper and lower half shell for supporting the first and second web, which are arranged in the part of the hollow body where both shells are remarkably distanced to each other. As in the conventional art, both webs are supported by separate first and second reinforcement structures integrated between the outer and inner layer of the shell. Unlike at known blade designs, these reinforcement structures are solely made of glass fiber layer stacks, which glass fiber layers are infused with a resin and are therefore embedded in a resin matrix. Thus, no carbon fiber protruded strips respectively pre-fabricated carbon strip stacks are used for building the respective reinforcement structures, which are expensive and which are hard to be repaired respectively prevent the repair of adjacent areas like the adhesive area in case of need. Instead, simple glass fiber layer composite stacks are used, which can easily be built directly in the respective shell used for producing the half shell by simply arranging the respective glass fiber layers for building the respective stack together with the other components needed for producing the half shell. As the half shell, which comprises several fiber layers being infused with the resin for building the respective upper and lower shell layer, is finally infused with the resin, also the glass fiber layer stacks are infused with the resin in this single infusion step. Thus, the first and second reinforcement structures are simultaneously infused and therefore built when also the rest of the half shell is infused and built.

As these reinforcement structures, adjacent to which the first and second web is attached to the inner layer of the respective shell, are made of glass fiber layers embedded in the resin matrix, another advantage of this setup is the possibility to ease the joint repair where the web respectively the flange is attached to the inner layer, as it is possible to drill through these glass fiber reinforcement structures from the outside of the blade and inject adhesive through the glass laminate, an action which is not possible when carbon fiber protruded reinforcement structures are used, as they cannot be drilled.

So the use of the inventive glass fiber based reinforcement structure shows several advantages. First, they are simple in design and their production is simple and can be realised together with the production of the respective shell. Second, the mass of expensive carbon fiber-based reinforcement measures is severely reduced, as the first and second reinforcement structures do not comprise any carbon fiber strips. And third, the possibility for repairing these areas especially in the joint region is given, as the glass fiber-based reinforcement structures can be drilled.

The inventive turbine blade is not only characterised by using glass fiber based first and second reinforcement structures, but also by integrating a specific stiffening element between the first and second reinforcement structures. Also, this stiffening element is integrated in the respective half shell between the upper and lower layer. At least one stiffening element is provided, which extends over at least a part of the length of the first and second reinforcement structures. This stiffening element comprises at least one stack composed of several pultruded composite strips comprising carbon fibers. The strips are also embedded in the resin, in which also the glass fiber based first and second reinforcement structures are embedded.

Overall embodiments of the invention propose a single reinforcement means comprising the first and second reinforcement structures being directly adjacent to the webs, and the stiffening means being arranged between both reinforcement structure, with the whole reinforcement means being infused or embedded in the resin respectively a resin matrix. Thus, this reinforcement means can be seen as a single spar cap which support both webs.

As only in the stiffening element carbon fibers are present, the total mass of carbon pultrusion material is reduced. Further it is possible to locate the stiffening means in an optimal position within the profile of the respective shell in view of the loads respectively the load distribution, as this stiffening means shows enhanced mechanical properties, from which also the first and second reinforcement structures, which are directly connected via the resin matrix, participate.

The stiffening element comprises glass and/or carbon fiber layers arranged between each pair of strips, which layers are infused with the resin. These intermediate glass or carbon fiber layers or fabrics allow the infusion with the resin between neighbouring pultrusion strips, which are firmly fixed to each other after curing the resin. Such a stiffening element can be produced as a pre-fabricated element and be inserted into the respective shell mould, in which the shell is produced and can be embedded in the resin matrix when the shell is infused with the resin. On the other hand, it is possible to also build this stiffening element, just like the reinforcement structures, directly in the respective shell mould simply by arranging the separate strips and the intermediate fiber layers or fiber fabrics in the shell mould and provide the resin infusion together with the overall shell infusion. This makes it possible to build the stiffening element directly in the shell mould and thus to build the whole reinforcement means comprising the reinforcement structures and the stiffening element together in one single resin infusion step together with the overall infusion of the relevant shell components.

The glass and/or fiber layers sandwiched between two neighbouring carbon pultruded strips are biaxial layers. A biaxial fiber layer or fabric comprises fibers being arranged in an angle of 0° with other fibers being arranged at an angle of e.g. ±45°. Such a biaxial layer is advantageous, as it allows to take loads of different directions respectively of different types, e.g. loads from a flapwise or an edgewise bending of the blade.

In a further embodiment of the invention, the first and second reinforcement structures and the stiffening element are mechanically connected via at least one glass or carbon fiber layer extending from the first reinforcement structure through the stiffening element to the second reinforcement structure. The reinforcement structures and the stiffening element are not only embedded in a common resin matrix, but are also mechanically connected by at least one glass or carbon fiber layer, which extends through all these elements respectively parts of the reinforcement means. This common fiber layer serves for an even enhanced mechanical stability and stiffness of the reinforcement means arrangement and allows for an even better load support and load distribution.

At least one of the glass or carbon fiber layers of the stiffening element extends into both stacks of the first and second reinforcement structures. So the mechanical connection is provided by at least one glass or carbon fiber layer which is sandwiched between two neighbouring carbon pultrusion strips and which is thus an integral part of the stiffening element stack. This glass or carbon fiber layer extends to both sides into the respective glass fiber stack, which then comprises this extended stiffening element layer as an integral layer of the stack. If this extended layer is a glass fiber layer, each reinforcement structure is an element which solely comprises glass fibers. If the extended fiber layer is a carbon fiber layer, the reinforcement element is built nearly entirely from glass fiber layers with only one or a few sandwiched carbon fiber layers.

Even though an improved mechanical layout is realised throughout the reinforcement means when only one layer extends through both reinforcement structures and the stiffening element, it is desirable that all glass or carbon fiber layers of the stiffening element extend into both stacks of the first and second reinforcement structures. So there are several mechanical connection planes connecting the reinforcement structures with the stiffening element, which enhances the mechanical properties of this reinforcement means even more.

In a first inventive alternative only one stiffening element is provided, which extends over at least 70%, at least 80% and especially over the entire length of the first and second reinforcement structures. Thus, both reinforcement structures are mechanically couple by only one stiffening element, which extends over most of the reinforcement structure length, over their entire length, so that the whole reinforcement means, which can also be named as a hybrid reinforcement means or hybrid spar cap, extends in this specific setup over almost the entire blade length.

In another alternative it is possible that two or more stiffening elements are provided, each of which extends only over a part of the length of the first and second reinforcement structures. In this embodiment two or more separate and shorter stiffening elements are provided, which follow each other in the lengthwise direction but are distanced from each other, so that there is a gap between the stiffening elements, seen in the lengthwise blade direction. This gap may for example be filled with resin or with a light weight, but stiff core element for example made of wood or a polymer or the like, which core element is also embedded in the resin matrix of the whole reinforcement means. This embodiment allows for an even greater reduction of the used carbon material and therefore reduces the overall costs even more.

In an embodiment the stacks of the first and second reinforcement structures comprise biaxial and uniaxial glass fiber layers. As already mentioned, a biaxial fiber layer comprises fibers being arranged at an angle of 0° and other fibers being arranged at an angle of e.g. ±45°. Uniaxial fiber layers instead only comprise parallel fibers, which run in the lengthwise blade direction just like the 0° fibers of the biaxial layers. The biaxial layers allow to take loads of different directions respectively of different types, i.e. loads due to a flapwise and an edgewise bending of the blade, whereas the uniaxial fibers or layers especially enhance the stiffness against a flapwise bending. These different layer types may be arranged in an alternating manner with a uniaxial layer being followed by a biaxial layer being followed by a uniaxial layer etc. But it is also possible to stack for example two or three uniaxial layers followed by one or two biaxial layers again followed by three uniaxial layers etc. So specific designs regarding the arrangement of the different layer types are possible.

Furthermore, core elements are provided between the outer and the inner layer of the respective upper and lower half shell adjacent to the first and second reinforcement structures. These core elements, which are used for further adjusting the mechanical properties of the blade also in the areas next to the shell integrated reinforcement means, are also sandwiched between the outer and the inner layer of the respective upper and lower half shell. These core elements may be made of foam, wood or polymer for example, while also this enumeration is not final.

Embodiments of the invention also refer to a wind turbine comprising several turbine blades as described, desirably three turbine blades.

BRIEF DESCRIPTION

Some of the embodiments will be described in detail, with reference to the following figures, wherein like designations denote like members, wherein.

DETAILED DESCRIPTION

Figure 1:
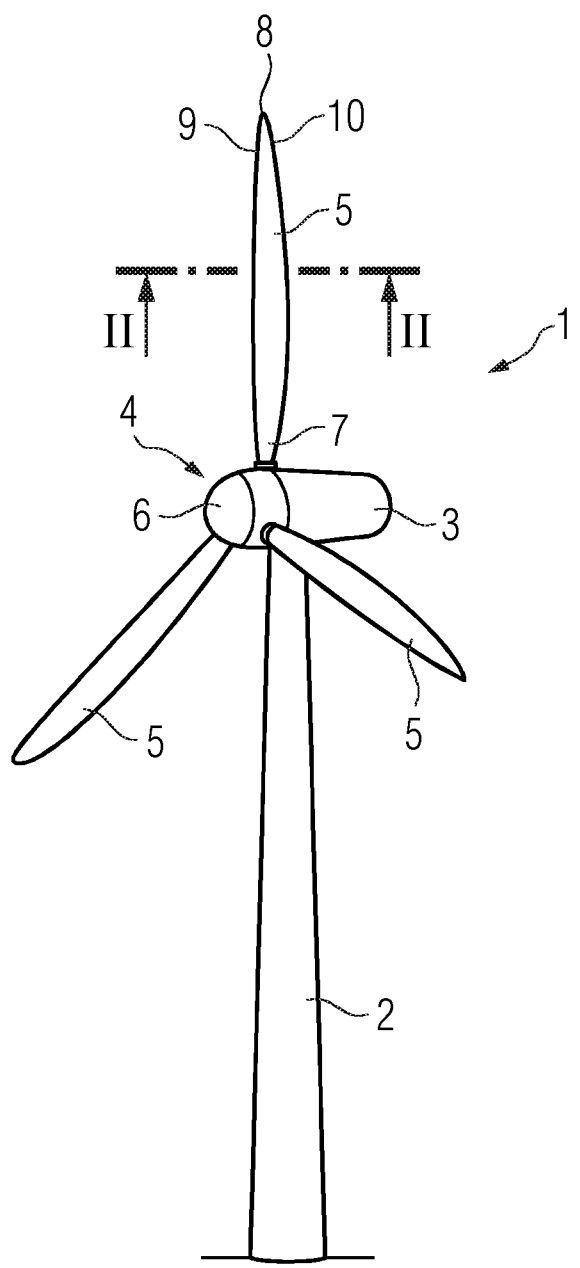
FIG. 1 shows a principle sketch of a wind turbine.

FIG. 1 shows a principle sketch of a wind turbine 1 comprising a tower 2, a nacelle 3 mounted on top of the tower 2 and a rotor 4 comprising three wind turbine blades 5 attached to a hub, which is operatively coupled to a generator arranged in the nacelle 3, which generator is driven by the rotational energy of the rotor 4 for producing electric power as commonly known.

Each turbine blade 5 comprises a root 7 for attaching the blade 5 to the hub 6 and a tip 8 at the other end. It furthermore comprises a leading edge 9 and a trailing edge 10.

Embodiments of the invention relate to the setup of the wind turbine blades 5.

Figure 2:
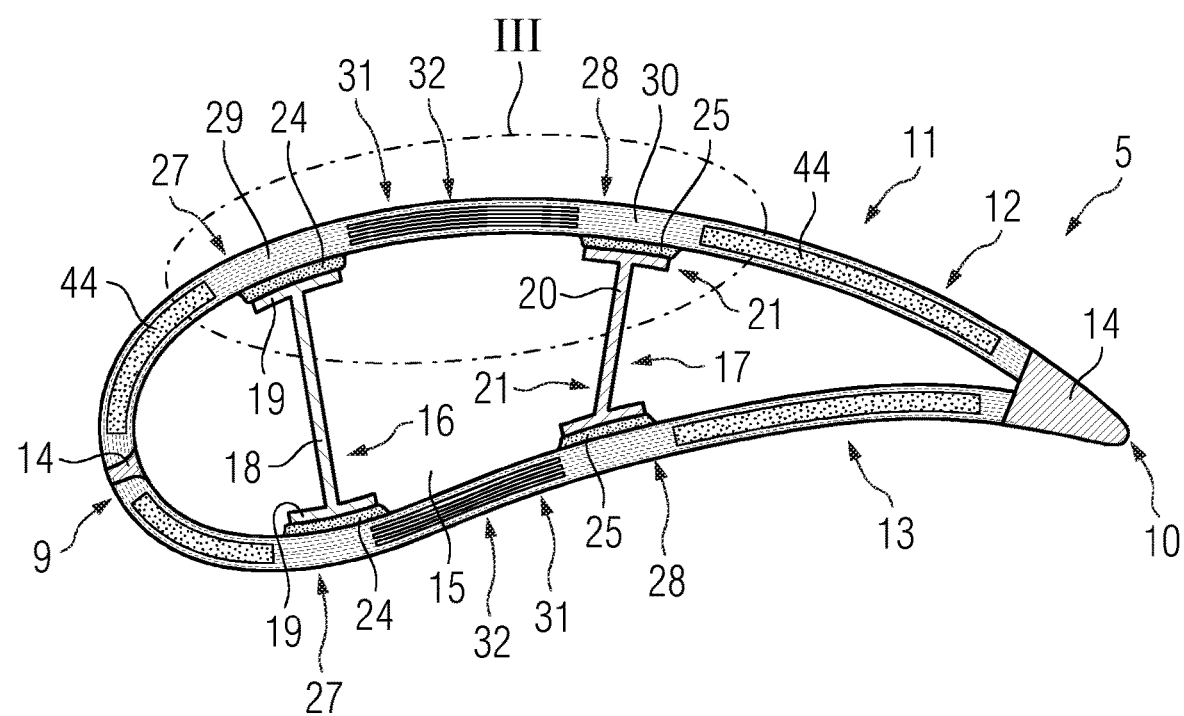
FIG. 2 shows a cross section through a blade of FIG. 1 along the line II-II.

FIG. 2 shows a principle cross sectional view of the turbine blade 5 taken along the line II-II of FIG. 1. The blade 5 comprises a hollow body 11, which is made of an upper half shell 12 and a lower half shell 13, which are fixed to each other with an adhesive 14 and which encases a hollow space 15. In this space 15 a first web 16 and a second web 17 are arranged. Both webs 16, 17 are arranged in the area, where the upper half 12 and the lower half 13 have a great distance respectively where the blade has a great thickness. Both webs 16, 17 extend almost in parallel and almost over the whole length of the blade 5 starting adjacent to the root 7 and ending adjacent to the tip 8.

Both first and second webs 16, 17 are used for supporting the blade shells 12, 13 and for taking and distributing the respective loads resting on the blade 5, which loads result from aerodynamic circumstances due to the rotation of the rotor 4 and the mechanical circumstances due to the weight of the blade 5 itself.

The first web 16 comprises a web body 18 and two flanges 19 integrally attached to the web body 18 at its ends. The same H-shaped design is also realised at the second web 17, which comprises a web body 20 and two terminal flanges 21 integrally attached to the web body 20.

Figure 3:
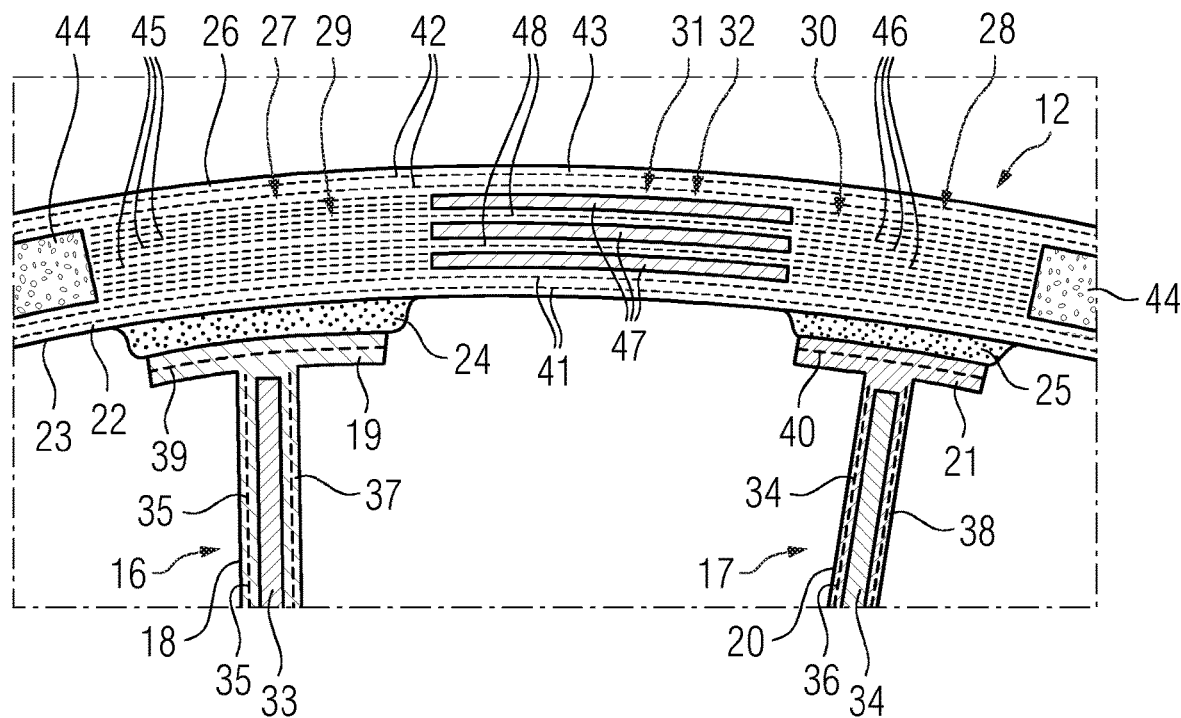
FIG. 3 shows an enlarged view of the section III of FIG. 2.

By these flanges 19, 21 both webs 16, 17 are attached to the inner side 22 of an inner layer 23 by means of an adhesive 24, 25, see also FIG. 3. The inner layer 23 is part of the respective half shell 12, 13, as shown in FIG. 3. FIG. 3 shows only a part, i.e. the section III of FIG. 2 of the upper half shell 12. It is to be noted that the same setup is also given at the lower half shell 13. While the inner layer 23 forms the inner part of the respective shell 12, 13, an outer layer 26 forms the outer part of the respective half shells 12, 13. The design will be further discussed in detail in regard to FIG. 3.

As both webs 16, 17 are attached to the inner layer 23 of the shells 12, 13 by the adhesives 24, 25, they need to be firmly supported by the respective shells 12, 13. To realise this support in each shell 12, 13 first reinforcement structures 27 for supporting the first web 16 and second reinforcement structures 28 for supporting the second web 17 are arranged respectively integrated and sandwiched between the inner and outer layers 23, 26. These reinforcement structures 27, 28 are made of respective stacks 29, 30 made of several layers of glass fiber fabric infused with resin, which setup is discussed in more detail in regard of FIG. 3.

Between both reinforcement structures 29, 30, which are arranged in both shells 12, 13, a stiffening element 31 is arranged, which comprises a stack of several carbon fiber pultruded strips, which are also embedded in a resin, and in the resin, in which also the glass fiber layer stacks 29, 30 are embedded. In total the combination of both reinforcement structures 27, 28 and the stiffening element 31 forms a single hybrid reinforcement means or hybrid spar cap, which is, due to the embedding of the respective stacks 29, 30 and the stack 32 comprising the carbon fiber pultruded strips, a very stiff element, which extends in a lengthwise direction of the blade and supports both webs 16, 17.

As can be seen from FIG. 2, the stiffening element 31 is arranged in the blade area, where higher loads arise. The blade shells are firmly stiffened by inserting this carbon fiber based stiffening element in combination with the reinforcement structures, which support the further stiffening webs, so that a very stiff blade area and design is realised, which is able to take and distribute also high loads arising during the operation of the wind turbine.

The glass fiber base reinforcement structures 27, 28 mainly serve for supporting the webs 16, 17 and do not need to be made from carbon fiber pultruded strip stacks. The stiffening means interposed between the reinforcement structures 27, 28 provides the respective stiffening of the relevant blade area and also provides an enhanced stiffening of the reinforcement structures 27, 28, as they are firmly attached to the stiffening element 31 by the common resin matrix. So the inventive blade 5 comprises a carbon fiber base stiffening element arranged in the optimal location in the profile regarding the appearance of the loads, while the reinforcement structures 27, 28 mainly serving for supporting the webs 16, 17 are made of glass fiber layers omitting carbon fiber pultruded strips. Therefore, in the overall blade design the amount of carbon pultruded material is reduced to what is necessary for providing the requested mechanical properties, while the reinforcement structures 27, 28 are built by common materials and in a known procedure as discussed below.

FIG. 3 shows an enlarged principal view of the section III of FIG. 2 in cross section. It shows in part both webs 16, 17. Both webs, which have the same or a comparable setup, comprise a core 33, 34, for example made of balsa wood or foam or the like, which extends over almost the whole length of the respective web body 18, 20. It is encased in glass fiber layers 35, 36 infused with resin 37, 38. The respective flanges 19, 21 are integral with the respective web bodies 18, 20. Also the flanges comprise several glass fiber layers 39, 40, which are also infused or embedded in the resin 37, 38. Although only one respective glass fiber layer 35, 36 and 39, 40 is shown, several of these layers are provided for building a respective massive and mechanically stiff encasing. Especially the several layers 39 and 40, which build the central part of the respective flanges 19, 21, comprise as well biaxial glass fiber layers as uniaxial glass fiber layers, which are infused or embedded in the respective resin 39, 40. Also the several layers 35, 36 at the respective web bodies 18, 20 may comprise uniaxial and biaxial glass fiber layers, which may be, just like in the flanges 19, 21, stacked in an arbitrary order.

As FIG. 3 also shows, the respective flanges 19, 21 are firmly fixed to the inner surface 22 of the inner layer 23 by means of the layers of adhesive 24, 25. This provides a very solid joint, which is necessary, as over this joint the respective loads are transferred.

The enlarged view of FIG. 3 also shows the two reinforcement structures 27, 28 and the stiffening element 31. It is obvious that both the reinforcement structures 27, 28 and the stiffening element 31 are sandwiched between the inner and outer layers 23, 26, which layers 23, 26 comprise several glass fiber layers 41, 42, which are infused or embedded in a resin 43, which is infused throughout the whole respective shell 12, 13, and which also embeds core elements 44 for example made of foam or balsa wood, which are arranged in the respective shell areas adjacent to the reinforcement structures 27, 28. No need to say that each layer 23, 26 may certainly comprise way more than only two glass fiber layers 41, 42 as shown in the principal sketch of FIG. 3.

As mentioned, the reinforcement structures 27, 28 are sandwiched between the inner and outer layer 23, 26. Each reinforcement structures 27, 28 is built from a stack 29, 30 comprising a certain number of glass fiber layers 45, 46, some of which are shown in FIG. 3. These glass fiber layers 45, 46 comprise uniaxial layers and biaxial layers, which may also be arranged in an arbitrary order. Also, these glass fiber layers 45, 46 are infused or embedded in the resin 43.

As FIG. 3 further shows, the stiffening element 31 is directly arranged next to the reinforcement structures 27, 28. It comprises a stack 32 comprising several carbon fiber pultruded strips 47. The width of these strips 47 corresponds to the gap between the respective glass fiber stacks 29, 30 of the reinforcement structures 27, 28, so that the reinforcement structures 27, 28 directly connect to the stiffening element 31.

Between two strips 47 one or more glass fiber layers 48 are provided, biaxial glass fiber layers or fabrics, which are used for infusing resin between two neighbouring strips 47 for firmly fixing them. As is obvious from FIG. 3, the glass fiber layers 48 of the stiffening element 31 extend on both sides of the stiffening element 31 and extend into the respective glass fiber layer stacks 29, 30 of the reinforcement structures 27, 28. This means that the extended glass fiber layers 48 form also a part of the respective glass fiber layer stacks 29, 30. As also the stiffening element 31 is infused or embedded in the overall resin 43, not only the resin 43 provides the mechanical connection of the reinforcement structures 27, 28 and the stiffening element 31, but also the embedded glass fiber layers 48 running or extending through the stiffening element 31 and both reinforcement structures 27, 28. While FIG. 3 only shows one glass fiber layer 48 sandwiched between two strips 47, it is clear that there may be more such layers, while certainly also more than three strips 47 may be provided. All of these sandwiched glass fiber layers 48 of the stiffening element 31 extend into the respective glass fiber stacks 29, 30 of the reinforcement structures 27, 28, so that many connection planes can be realised by these common glass fiber layers.

As FIG. 3 shows, the glass fiber based reinforcement structures 27, 28 are in direct extension of the webs 16, 17. This allows in case of need to perform repair works at the reinforcement structures 27, 28, at the webs 16, 17 and especially at the respective joints of adhesive 24, 25, as these glass fiber based reinforcement structures 27, 28 can be drilled. It is possible to drill holes or the like in these reinforcement structures, through which for repair reasons resin can be pressed or infused in order to repair the reinforcement element resin matrix or the adhesive joint etc. This is possible, as the reinforcement structures 27, 28 are in this embodiment solely built from glass fiber layers.

Even if carbon fiber layers 48 are used in the carbon fiber pultrusion stack 32 and if they extend in the respective glass fiber stacks 29, 30, they do not hinder the above mentioned repair possibility, as these thin carbon fiber layers 48 may also be drilled, and as only a few of these layers extend into the respective glass fiber stacks 29, 30.

The hybrid reinforcement means or hybrid spar cap comprising the stiffening element 31 and the reinforcement structures 27, 28 may comprise only one stiffening element 31 extending parallel to the reinforcement structures 27, 28 over almost the entire length of the blade 5. Aside providing only one stiffening element 31 it is possible to arrange two or more separate but shorter stiffening elements 31, which are arranged one after the other in lengthwise direction of the blade 5 with a certain gap between them. This gap may be filled with a core element, for example a foam element or the like, allowing a further reduction of the used carbon fiber mass while also providing enough stiffness, as the several stiffening elements 31 are still firmly embedded in the overall common matrix of the resin 43 and are also mechanically connected to the reinforcement structures 27, 28 by the extending glass fiber layers 48.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade, with a generally hollow blade body comprising:
    an upper and a lower half shell and first and a second elongated webs each extending in the lengthwise direction of the blade and being disposed between and connected to the upper and the lower half shell,
    wherein each elongated web comprises an upper and a lower flange connecting the respective elongated web to the respective half shell, and
    wherein the first and second elongated webs are supported via respective first and second reinforcement structures in the respective half shell, which reinforcement structures are arranged between an outer and an inner layer of the upper and lower half shell and extend in the lengthwise direction of the blade, wherein the first and second reinforcement structures each comprise at least one stack composed of a plurality of glass fiber layers infused with resin, and wherein at least one stiffening element extends parallel to the first and second reinforcement structures, wherein the at least one stiffening element comprises at least one stack composed of a plurality of pultruded composite strips comprising carbon fibers with the composite strips being fixed in the resin, and wherein the at least one stiffening element is arranged between the first and second reinforcement structures.

2. The wind turbine blade according to claim 1, wherein the stiffening element comprises glass and/or carbon fiber layers arranged between each pair of strips which layers are infused with the resin.

3. The wind turbine blade according to claim 2, wherein the glass and/or fiber layers are biaxial layers.

4. The wind turbine blade according to claim 1, wherein the first and second reinforcement structures and the stiffening element are mechanically connected by at least one glass or carbon fiber layer extending from the first reinforcement structure through the stiffening element to the second reinforcement structure.

5. The wind turbine blade according to claim 1, wherein at least one of the glass or carbon fiber layers of the stiffening element extends into both stacks of the first and second reinforcement structures.

6. The wind turbine blade according to claim 5, wherein all glass or carbon fiber layers of the stiffening element extend into both stacks of the first and second reinforcement structures.

7. The wind turbine blade according to claim 1, wherein only one stiffening element is provided, which extends over at least 70% of the first and second reinforcement structures.

8. The wind turbine blade according to claim 1, wherein two or more stiffening elements are provided, each of which extends only over a part of the length of the first and second reinforcement structures.

9. The wind turbine blade according to claim 1, wherein the stacks of the first and the second reinforcement structures comprise biaxial and uniaxial glass fiber layers.

10. The wind turbine blade according to claim 1, wherein core elements are provided between the outer and the inner layer of the respective upper and lower half shell adjacent to the first and second reinforcement structures.

11. The wind turbine blade according to claim 10, wherein the further core elements are made of foam, wood or polymer.

12. The wind turbine comprising a plurality of the wind turbine blade according to claim 1.

* * * * *